United States Patent [19]
Maass et al.

[11] Patent Number: 6,029,350
[45] Date of Patent: Feb. 29, 2000

[54] SPIRAL WOVEN COMPOSITE FLYWHEEL RIM

[75] Inventors: David Maass, New Haven; Douglas M. Hoon, Guilford, both of Conn.

[73] Assignee: GKN Westland Aerospace Inc., Wallingford, Conn.

[21] Appl. No.: 09/076,467

[22] Filed: May 12, 1998

Related U.S. Application Data

[62] Division of application No. 08/662,785, Jun. 12, 1996, Pat. No. 5,778,736.

[51] Int. Cl.$^7$ .................................................. B21D 53/26
[52] U.S. Cl. ............................................. 29/894; 264/257
[58] Field of Search ................... 29/894, 894.2; 74/572, 445; 264/257

[56] References Cited

U.S. PATENT DOCUMENTS

| | | | |
|---|---|---|---|
| 3,363,479 | 1/1968 | Pickels | 74/572 |
| 3,602,066 | 8/1971 | Wetherbee, Jr. | |
| 3,602,067 | 8/1971 | Wetherbee, Jr. | 74/572 |
| 3,788,162 | 1/1974 | Rabenhorst et al. | 74/572 |
| 4,000,665 | 1/1977 | Rabenhorst | 74/572 |
| 4,052,913 | 10/1977 | Schultz et al. | |
| 4,098,142 | 7/1978 | Weyler, Jr. | 74/572 |
| 4,102,221 | 7/1978 | Hatch | |
| 4,187,738 | 2/1980 | Knight, Jr. et al. | 74/572 |

(List continued on next page.)

FOREIGN PATENT DOCUMENTS

| | | |
|---|---|---|
| 5 410 958 4 | of 1979 | European Pat. Off. |
| 5 508 283 6 | of 1980 | European Pat. Off. |
| 0 066 040 | of 1982 | European Pat. Off. |
| 0 081 968 | of 1982 | European Pat. Off. |
| 0187080 | 7/1986 | European Pat. Off. |
| 2336604 | 7/1977 | France |
| 3 041 044 | of 1982 | Germany |
| 21477 | 2/1979 | Japan .................. 74/572 |
| 201139 | 10/1985 | Japan .................. 74/572 |
| 735850 | 5/1980 | U.S.S.R. .............. 74/572 |
| 916814 | 4/1982 | U.S.S.R. .............. 74/572 |
| 956865 | 9/1982 | U.S.S.R. .............. 74/572 |
| 991084 | 1/1983 | U.S.S.R. .............. 74/572 |

OTHER PUBLICATIONS

Berechnung und Dimensionierung von Faserverbund–Schwungradern zur Energiespeicherung, *Konstruktion*, Spring 1981.
"Toward Optimizatioin of the Woven Flywheel" by Alan D. Sapowith and William E. Handy–Aug. 1981.
English Translation of the Japanese Patent Report Kokai No. Sho 54–21477–Feb. 1979.
Project Summary–Project Title: Evaluation of Composite Flywheel Materials Construction–Principal Investigator: Alan D, Sapowith Aug. 1979–Sea 1980.
Design and Fabrication of a Fiberglass Circular–Weave Composite Flywheel by Alan D. Sapowith and Arthur L. Gurson–Jan. 1983.

*Primary Examiner*—P. W. Echols
*Attorney, Agent, or Firm*—Nims, Howes, Collison Hansen & Lackert

[57] ABSTRACT

A fiber reinforced composite flywheel for energy storage has a plurality of disks in the form of a coil produced of continuous hoop and radial fibers, each disk having a mix of fiber types in the hoop direction, relatively strong fibers disposed about an inner section of the disk, an intermediate section of the disk comprised of relatively strong and relatively lower strength fibers, and an outer portion having a mix of fibers fewer relatively strong fibers. A fiber reinforced composite flywheel, alternatively or in addition, has a higher volume of radial fibers disposed about the intermediate section of the disk, to increase radial strength in a banded area of the disk subject to increased radial stress. Preferably, the disk is composed with a 3-dimensional orthogonal weave architecture which allows the fibers to shear during weaving to provide minimum distortion of the spiral woven disk. Constructing a spiral woven composite flywheel disk in accordance with the invention optimizes stress and strength properties to increase operating speed and energy storage capacity at minimum cost.

4 Claims, 3 Drawing Sheets

U.S. PATENT DOCUMENTS

| | | |
|---|---|---|
| 4,198,878 | 4/1980 | Lewis et al. ............................... 74/572 |
| 4,207,778 | 6/1980 | Hatch ....................................... 74/572 |
| 4,266,442 | 5/1981 | Zorzi . |
| 4,285,251 | 8/1981 | Swartout . |
| 4,286,475 | 9/1981 | Friedericy et al. . |
| 4,341,001 | 7/1982 | Swartout . |
| 4,370,899 | 2/1983 | Swartout . |
| 4,413,860 | 11/1983 | Prescott ..................................... 74/572 |
| 4,458,400 | 7/1984 | Friedericy et al. . |
| 4,537,091 | 8/1985 | Kulkarmi et al. ........................ 74/572 |
| 4,817,453 | 4/1989 | Breslich, Jr. et al. .................... 74/572 |
| 4,821,599 | 4/1989 | Medlicott . |
| 4,996,016 | 2/1991 | Walls et al. . |
| 5,285,699 | 2/1994 | Walls et al. . |
| 5,452,625 | 9/1995 | Nardone et al. ......................... 74/572 |

SPIRAL WOVEN COMPOSITE FLYWHEEL RIM

This is a divisional of U.S. patent application Ser. No. 08/662,785, filed Jun. 12, 1996, now U.S. Pat. No. 5,778, 736.

TECHNICAL FIELD

This invention relates to flywheels for energy storage and more particularly to a fiber composite flywheel utilizing a coil of spiral woven disks having a mix of fibers in the hoop direction and/or an increase in fiber volume of radial fibers in an intermediate disk section for optimizing stress and strength properties.

BACKGROUND OF THE INVENTION

Fiber reinforced composite flywheels have been proposed for use as energy storage systems for vehicles and as auxiliary power sources for utilities. However, a practical reasonably priced fiber composite flywheel has been difficult to achieve.

Fiber reinforced composite flywheels have been manufactured by filament winding, and by the hand lay up of multiple preimpregnated plys, for example, as described in U.S. Pat. Nos. 4,102,221 and 4,266,442.

Such composite flywheels exhibit high stiffness and strength in the hoop direction of the flywheel, and low weight relative to metal flywheels. However, such fibers are highly anisotropic, as the transverse stiffness and strength is typically much lower than the longitudinal stiffness and strength. Therefore, fiber reinforced composite flywheels are typically constructed of fiber wound predominately in the circumferential or hoop direction, which reduces radial growth at high speeds.

The growth characteristic is of particular importance as a flywheel rim of one material is commonly bonded to a hub of another material. As speed increases, the differential growth between the rim and hub may cause separation between the two.

Another important characteristic is radial stress which limits the flywheel rotational speed and thus the flywheels' energy storage capacity. The weaker transverse (radial) strength of the composite makes this a key parameter in flywheel design, as the fibers may separate circumferentially along the axis of the fiber.

To overcome these problems, it has been attempted to preload the fibers, to have an initial state of radial compression, as discussed for example in U.S. Pat. No. 5,285,699. However, there are limits to the amount of preload that can be achieved.

In U.S. Pat. No. 5,452,625, annular shaped inserts are interleaved and bonded with annular fiber reinforced composite disks, the annular inserts having a high radial strength substantially greater than the composite section radial strength, to increase the overall radial strength of the assembly. But the difference in stiffness properties, thermal expansion, and growth characteristics at high speed provides a potential for delamination between these disks.

A spiral woven fiber reinforced flywheel rim has been considered, however, the prior efforts have not gained acceptance.

SUMMARY OF THE INVENTION

It is an object of the present invention to provide a fiber reinforced composite flywheel rim which has substantially balanced hoop and radial strengths.

It is a further object to provide a fiber reinformed composite flywheel rim having a varied radial fiber volume across the radius of the flywheel, to control the rim growth to correspond to the growth characteristics of a hub.

It is a further object to provide a fiber reinforced composite flywheel of relatively low cost.

It is yet another object to provide a method for producing a fiber reinforced composite flywheel rim having controlled growth characteristics and increased radial strength.

These and other objects of the present invention are achieved by a fiber reinforced composite flywheel having plural disks in the form of a coil formed from a continuous spiral of woven fibers, each disk having a first plurality of fibers oriented in the hoop direction and a second plurality of fibers oriented in a radial direction, the hoop fibers extending from an inner radius to an outer radius of the disk, a first portion of the first plurality of fibers, located at an inner radius section of the disk composed of relatively strong fibers, a second portion of the first plurality of fibers located about an outer radius section of the disk, composed of a mix of relatively lower strength fibers and relatively strong fibers, the combination of strong fibers and lower strength fibers varying across the radius of the disk to control differential growth of the flywheel rim and total flywheel material cost.

The present invention also comprises a fiber composite flywheel rim having plural disks in the form of a coil of a continuous spiral of woven fibers, each disk having a first plurality of fibers oriented in a hoop direction and a second plurality of continuous fibers woven through the first plurality of fibers in a radial direction, each disk having radial fibers in a relatively higher volume in an intermediate section of the disk radius, to increase radial strength.

In another embodiment of the present invention, the spiral woven fiber has a 3 dimensional orthogonal weave architecture, to increase flexibility during preform construction, to minimize in-plane distortion and increase strength in both the hoop and radial directions.

A further embodiment of the invention utilizes a relatively high volume of stiff fibers in the inner section of the disk radius, to increase stiffness adjacent the portion of the rim which is mated to a relatively stiff hub to minimize the potential for separation between the rim and hub.

A further embodiment of the invention utilizes a small amount of a fatigue-sensitive sacrificial fiber in an innermost section of the disk radius to provide for detection of incipient failure and to allow for an orderly and safe system shutdown.

DETAILED DESCRIPTION OF THE INVENTION

Figure 1:
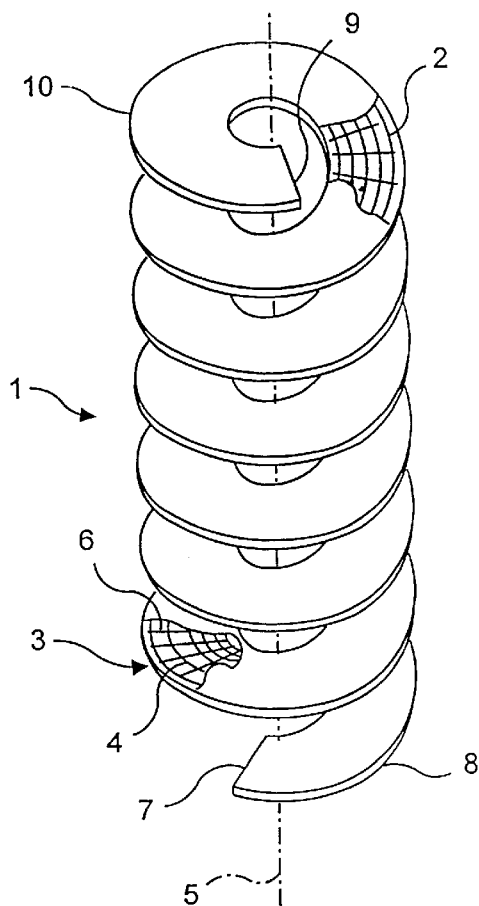
FIG. 1 is an exploded view of a preform of a spiral woven flywheel rim, produced in accordance with the present invention.

Referring to FIG. 1, a disk coil 1 is formed from spiral woven fibers 2. Each disk 3 has hoop or warp fibers 4 which are circumferentially disposed relative to an axis 5. The weave also has one or more radial or pick fibers 6 which extend radially relatively to the axis 5. The fibers are continuous, meaning that there are no breaks in the radial or hoop fibers from a starting end 7 of a first disk 8 to an ending end 9 of a last disk 10. The disks form a single continuous coil.

While one coil will be described relative to the present invention, it will be understood that the flywheel rim may be constructed in a laminated form of a plurality of such coils assembled in a stack, and molded. For purposes of this discussion, it will be presumed that the fibers are dry fibers woven into the form of a coil, which are then placed into a mold for resin injection via a resin transfer molding (RTM) process. Of course, preimpregnated fibers and other processing methods may be used for producing the inventive flywheel rim, and the invention is not limited to the resin transfer molding process.

Figure 2:
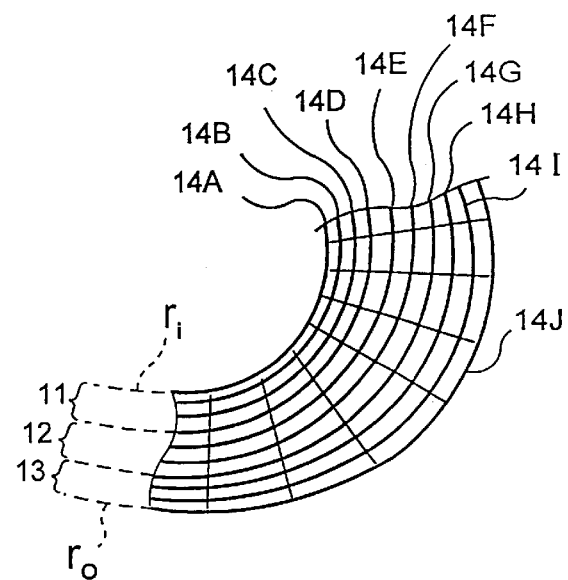
FIG. 2 is an exploded sectional view of one disk of the coil, illustrating the hoop and radial fiber construction.

Referring to FIG. 2, a cross section of one disk is shown. This disk has a mix of fiber types. Relatively strong hoop fibers are located close to an inner radius $r_i$ and a mix of relatively strong and relatively lower strength fibers are distributed to an outer radius $r_o$. Generally, strong and stiff fibers are needed in at least about the inner third of the disk radius to carry the highest rotor stresses and limit growth to match the growth of a typically stiff hub.

Relatively strong fibers are those composed of graphite, carbon or polyaramid, having a tensile strength of about 525 KSI or higher. Relatively stiff fibers are those having a tensile modulus of 33 MSI or higher, and it should be recognized that not all strong fibers are stiff fibers.

Relatively lower strength fibers are those which have a tensile strength below about 500 KSI, with glass fibers preferred. Consequently, it is contemplated to provide strong and stiff fibers about an inner portion of the disk, strong fibers in another portion, a mix of strong and relatively lower strength fibers in another portion and/or relatively lower strength fibers in a final portion of the disk.

In a preferred embodiment of the present invention, each disk has an inner radius section 11, composed solely of relatively strong fibers, a mix of strong and lower strength fibers in an intermediate section 12, and at the outer radius, there is an outer section 13 having a mix with fewer relatively strong and more relatively lower strength fibers.

By providing a distribution of fiber types from the inner to outer radius of the rim, it is possible to incorporate from about 5 to 85% by volume, based on the total hoop fiber volume, of relatively lower strength fibers in the rim. This mix of fibers allows the rim to retain operational strength at high speeds, but at lower manufactured cost. The mix of fibers can vary in each portion by having from 10 to 100% by volume, relatively lower strength fibers, starting after the initial radius section, $r_i$. Preferably, the distribution of relatively lower strength fibers increases with radius. Of the total hoop fiber volume, from about 10–70% lower strength fiber is preferred with about 20–50% most preferred.

Referring again to FIG. 2, the first three fibers 14A, 14B, and 14C are composed of strong and stiff graphite fibers; fibers 14D, 14E, and 14F are composed of a mix of strong graphite fibers and glass; fibers 14G, 14H, 14I and 14J are composed of glass. While the description is provided relative to fibers, it should be understood that these strands are typically yarns or bundles of individual filaments known as "tows" which contain from 1K to 50K of filaments per tow, and it is only to ease the illustration that single fibers are discussed.

By utilizing glass to displace some graphite fibers, material costs are substantially reduced, without any sacrifice in strength. In addition, growth across the radius of the rim is controlled to provide a relatively stable interface with a hub when mated to the flywheel rim.

Figure 3:
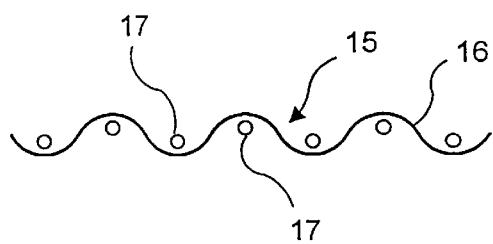
FIG. 3 is a side view of an over/under fiber weave.

Referring to FIG. 3, a cross-section of a weave structure 15 usable with the present invention is shown. The weave has an over/under construction which means that a first fiber 16 passes over and then under a plurality of crossing fibers 17. This applies to both the hoop fibers and radial fibers. While providing a tight weave, the fiber undulations provide a potential for reduced composite strength through fiber breakage. The interlocked fibers also limit the ability of the fibers to shear in-plane, which is necessary for minimizing distortion of the spiral woven disk.

Figure 4:
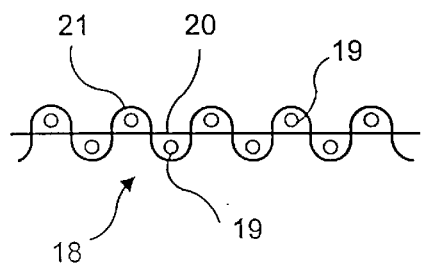
FIG. 4 is a side view of a 3-dimensional orthogonal weave architecture.

Referring to FIG. 4, a cross section of an alternative weave structure 18 is shown. This is a 3-dimensional orthogonal weave architecture. In this weave, the over/under interlocking of the crossed fibers is avoided. A first set of fibers 19 is laid in a staggered spaced relation, either entirely over or entirely under a crossing fiber 20 which remains flat, avoiding undulations. A third non-structural filament 21 is used to hold these fibers together. The filament 21 does not restrict the ability of the fibers to shear during forming, thus avoiding in-plane fiber distortion during preform assembly. The filament is typically a low denier glass yarn or a thermoplastic monofilament. In a preferred form of the invention, the radial and hoop fibers are combined in a 3 dimensional orthogonal woven coil to produce a flywheel rim in accordance with the present invention.

Figure 5:
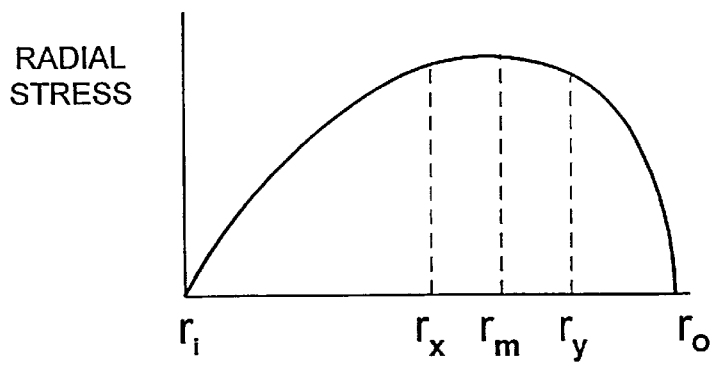
FIG. 5 is a graph showing radial stress versus radius for a typical fiber reinforced composite rim.

As previously discussed, an important parameter in fiber reinforced composite flywheel design is a need to maximize radial strength. Referring to FIG. 5, a typical distribution showing the amount of radial stress from an inner radius $r_i$ to the outer radius $r_o$ of a composite flywheel is shown, $r_m$ being a point of maximum radial stress. As indicated, an area banding $r_m$, from $r_x$ to $r_y$ is an area where additional reinforcement is desired.

In a spiral weave, as shown in FIG. 2, radial fibers extend repeatedly from an inner radius to an outer radius of the flywheel rim. In accordance with the present invention, an alternative spiral woven disk is constructed which provides a higher volume of radial fibers in an intermediate section of the rim where the maximum radial stress is encountered. This can be done independently of the use of the prior described fiber mix, though the combination of these techniques result in obvious benefits.

Figures 6A, 6B:
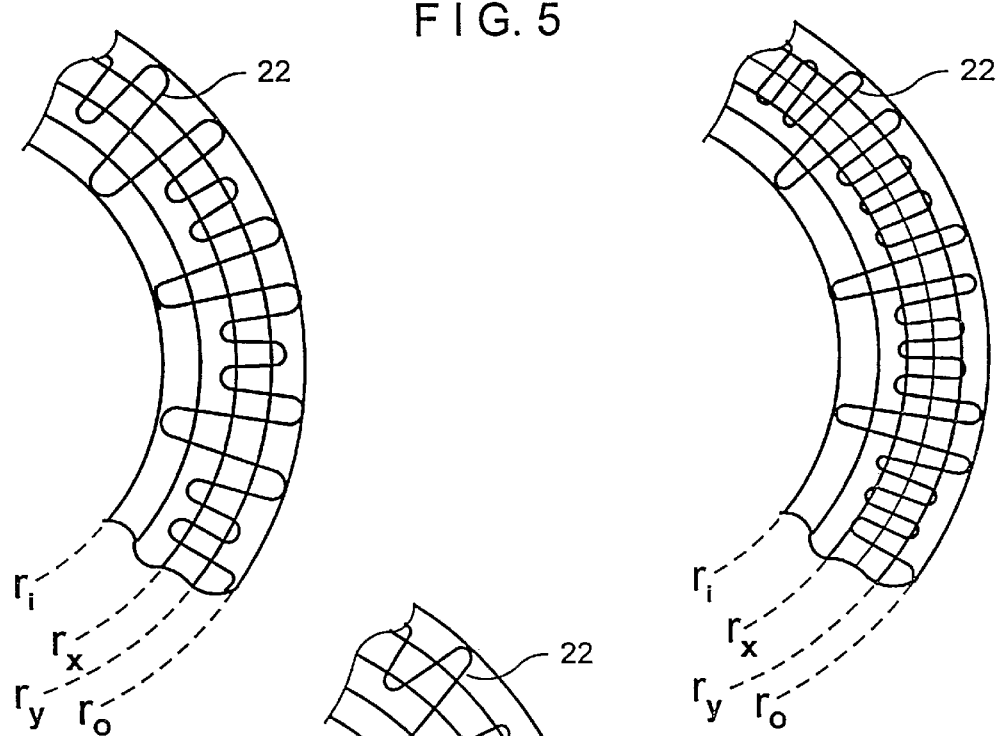
FIGS. 6a, 6b and 6c are alternative weave structures providing increased radial fiber volume in an intermediate section of the disk in accordance with the present invention.

Referring to FIG. 6a, a radial or pick fiber 22, initially travels from $r_i$ to $r_o$, but then the fiber returns only to about the point $r_x$ with a loop formed out to $r_y$, back to $r_x$ and out to $r_o$ then $r_i$. The pattern is repeated throughout the entire coil of the disks. In this manner, the number of loops of fiber increase the volume of radial fibers in the portion from $r_x$ to $r_y$ such that from 2 to 6 times the amount of radial fiber is present to increase radial strength in an intermediate section of the disk (corresponding to the area between $r_x$ and $r_y$.

An additional advantage of this construction is that there are less radial fiber loops about the area from $r_i$ to about $r_x$ which allows for an increase in the number of hoop fibers placed adjacent the inner radius, for increasing the strength of the portion of the rim adjacent to the hub where hoop stress is highest.

Referring to FIG. 6b, an alternative embodiment of the weave structure is shown which has increased loops for providing four times the volume of radial fibers in the intermediate section as compared to the inner and outer sections.

Figure 6C:
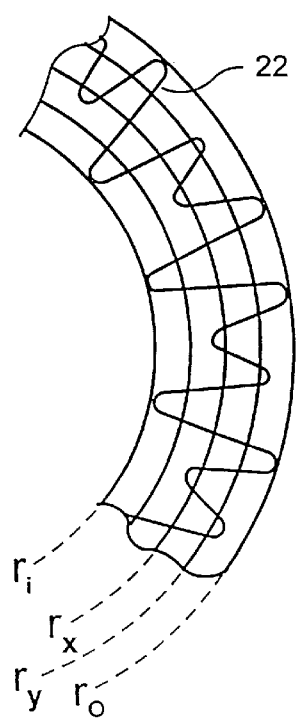

FIG. 6c shows yet another alternative embodiment of the weave structure which has double the radial fibers in the intermediate section as opposed to the inner and outer sections.

The radial fibers are preferably composed of a strong material since radial strength is a limitation on operating speed and energy storage capacity. Consequently, the radial fibers are preferably composed of graphite, carbon or polyaramid. Of course, other relatively strong fibers may also be used.

Figure 7:
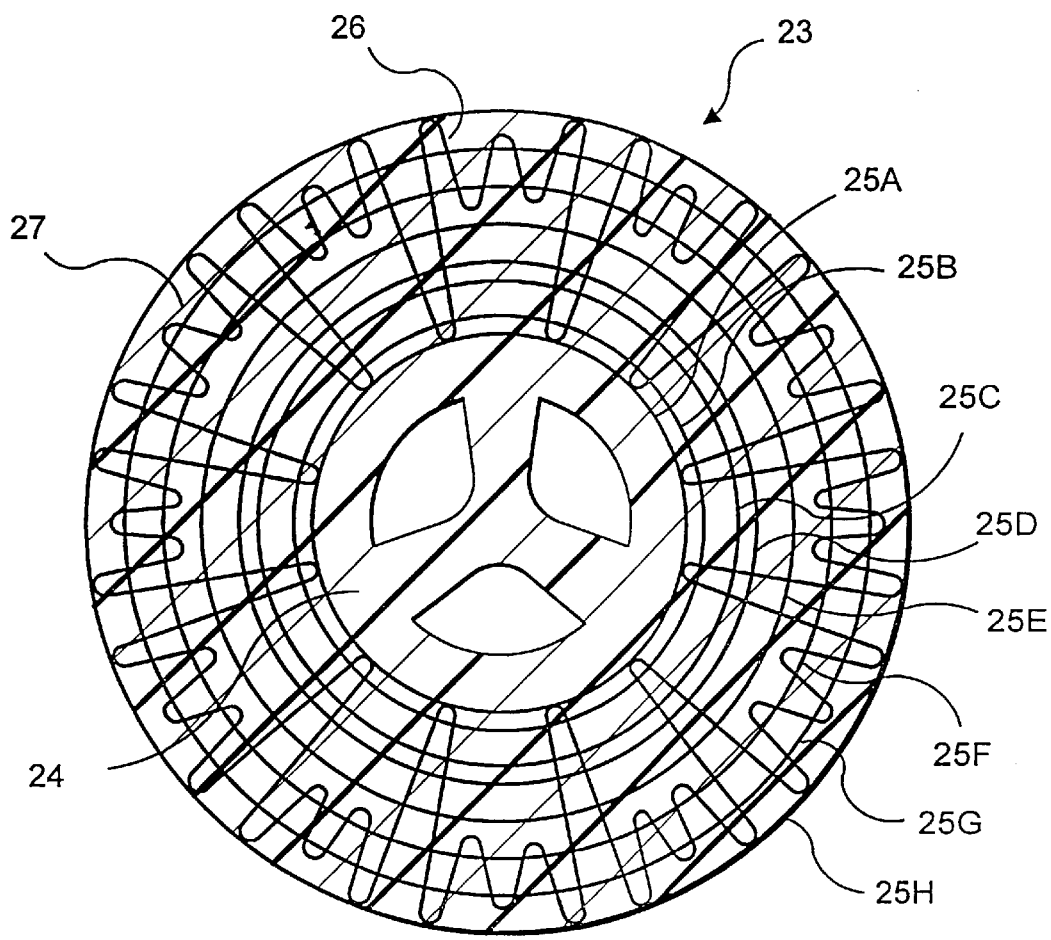
FIG. 7 is a flywheel constructed in accordance with the present invention having a high volume of hoop fibers at an inner radius section, a high volume of radial fibers in an intermediate section, the intermediate section having a combination of relatively strong and relatively lower strength fibers in the hoop direction.

Referring to FIG. 7, a preferred embodiment of the present invention is shown, using the combination of the above described improvements. A flywheel rim 23 is connected to a hub 24 at an interface therebetween. The rim has a relatively high volume of strong fibers 25A, 25B, and 25C in an inner radial section, composed of graphite. Hoop fibers 25D, 25E, and 25F are a mix of strong fibers (graphite) and relatively lower strength fibers, composed of glass. Hoop fibers 25G and 25H are a fiber mix containing fewer strong fibers and more lower strength fibers. A relatively strong radial fiber (graphite) 26 is looped in a weave pattern to provide a relatively high volume of radial fibers, about fibers 25E, 25F and 25G so as to maximize radial strength about the intermediate section of the flywheel rim.

Preferably, after the fibers are woven as described, the coiled disks are placed into a mold and injected with a solidifiable resin suitable for producing flywheels. These can be any of the commercially available resins such as epoxy, vinyl, polyesters, polyamide, polyimide, polyurethanes, bismalemide and combinations thereof. As shown in FIG. 7, the fibers are contained in a cured epoxy resin 27, illustrated by the hatched lines.

Figure 8:
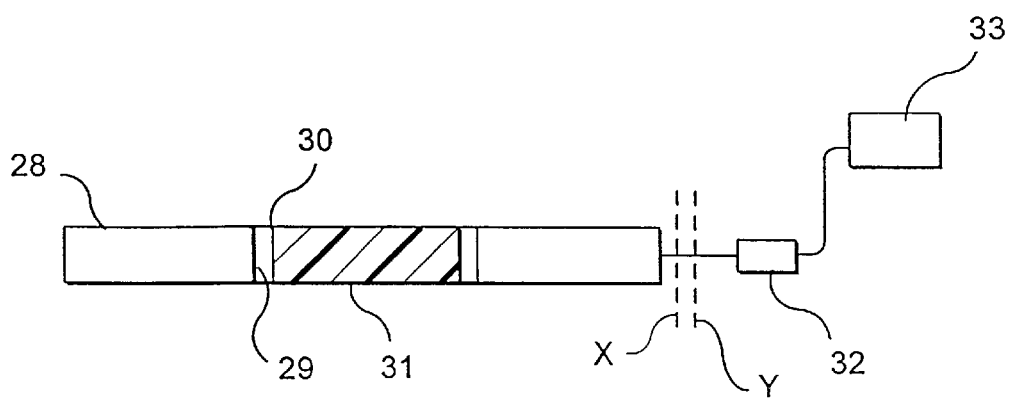
FIG. 8 is an illustration of an alterative embodiment of the invention utilizing a sacrificial yarn for monitoring the useful life of a composite flywheel rim.

In another embodiment of the present invention, shown in FIG. 8, a flywheel rim 28 includes a sacrificial yarn 29 disposed about an interface 30 between the flywheel rim and a hub 31. The yarn extends in the hoop direction and has a width approximating the width of the flywheel rim. The yarn is composed of a material which has a tensile and fatigue strength sufficient to withstand at least normal operating forces, up to about 110% of the expected maximum operating condition. This differs from the fibers used in the hoop direction in the flywheel rim, which have a strength sufficient to withstand up to about 150% of operating conditions, to provide a safety factor to avoid rim failure.

A sensor 32 is disposed adjacent the projected outer diameter of the rim, calibrated to accommodate radial growth at high speed. This is preferably a non-contact proximity sensor such as an ultrasonic, magnetic, capacitance or laser sensor. The yarn at the interface provides a means for detecting the condition of the composite, as failure of the yarn at the interface results in an incremental increase in rim diameter at high speed. This is detected by the sensor 32 which monitors flywheel diameter, the sensor communicating with a monitoring device 33. When growth is sensed due to yarn failure, the flywheel system is safely shutdown and the rim removed from service.

For example, as shown in FIG. 8, the sensor would monitor the normal operational growth, indicated as dashed line X, and once calibrated to that level, would consider that a normal operating condition. Should the yarn fail at the interface, a marginal increase in growth would occur, as illustrated by the dashed line Y. This discrepancy is noted by the sensor and relayed to a monitor which may contain an audio or visual alarm so that action can be taken to prevent serious flywheel failure.

The sacrificial yarn can be composed of glass, carbon, graphite or any other material, so long as it meets the necessary operating limits to assure failure of the yarn prior to failure of the hoop fibers.

While preferred embodiments of the present invention have been shown and described, it will be understood by those skilled in the art that various changes or modifications could be made without varying from the scope of the present invention.

We claim:

1. A method for producing a fiber reinforced composite flywheel rim comprising:

providing a plurality of hoop fibers, providing one or more radial fibers, weaving the hoop and radial fibers to form a plurality of spiral woven disks in the form of a coil, each disk having an inner radius section, an outer radius section and an intermediate radius section, incorporating a first portion of the plurality of woven hoop fibers composed of relatively strong fibers in the inner radius section, incorporating a second portion of the plurality of woven hoop fibers, composed of a mix of relatively strong and relatively lower strength fibers in the intermediate radius section and incorporating a third portion of the plurality of woven hoop fibers, composed of fewer to no relatively strong fibers, the balance being relatively lower strength fibers, in the outer radius section, for distribution of the relatively lower strength fibers across the radius of the disk.

2. A method for producing a fiber reinforced composite flywheel rim comprising:

providing a plurality of hoop fibers;

providing one or more radial fibers;

weaving the hoop and radial fibers to form a plurality of spiral woven disks in the form of a coil; and, incorporating a relatively high volume of woven radial fiber, as compared to an amount of the radial woven fiber in an inner radius section, in an intermediate area of the disk radius bracketing a location of high radial stress.

3. The method of claim 2 wherein the high volume of a radial fiber is incorporated in the disk by looping the radial fiber about the hoop fiber in a narrow band corresponding to the bracketed location of high radial stress.

4. The method of claim 2 further comprising:

placing the spiral woven disks in the form of a coil into a mold; injecting resin into the mold and curing the resin.

* * * * *